H. PULSE.
Seed Planter.

No. 62,066. Patented Feb. 12, 1867.

Witnesses:

Inventor:

United States Patent Office.

HIRAM PULSE, OF ST. PAUL, INDIANA.

Letters Patent No. 62,066, dated February 12, 1867.

IMPROVEMENT IN GRAIN-DRILLS.

The Schedule referred to in these Letters Patent and making part of the same.

TO WHOM IT MAY CONCERN:

Be it known that I, HIRAM PULSE, of St. Paul, Decatur county, Indiana, have invented a new and useful Grain-Drill; and I herebydeclare the following to be a full, clear, and exact description thereof, reference being had to the accompanying drawings, making a part of this specification.

This is an improvement in the class of grain-drills or planters adapted to be drawn forward by a horse or other animal, and to have its seeding apparatus propelled by the action of a ground-wheel; and my invention particularly relates to a provision within the planter for separating the seeds of cheat and other weeds from the grain to be sown, and to a device for rectifying any side draught of the animal.

Figure 1:
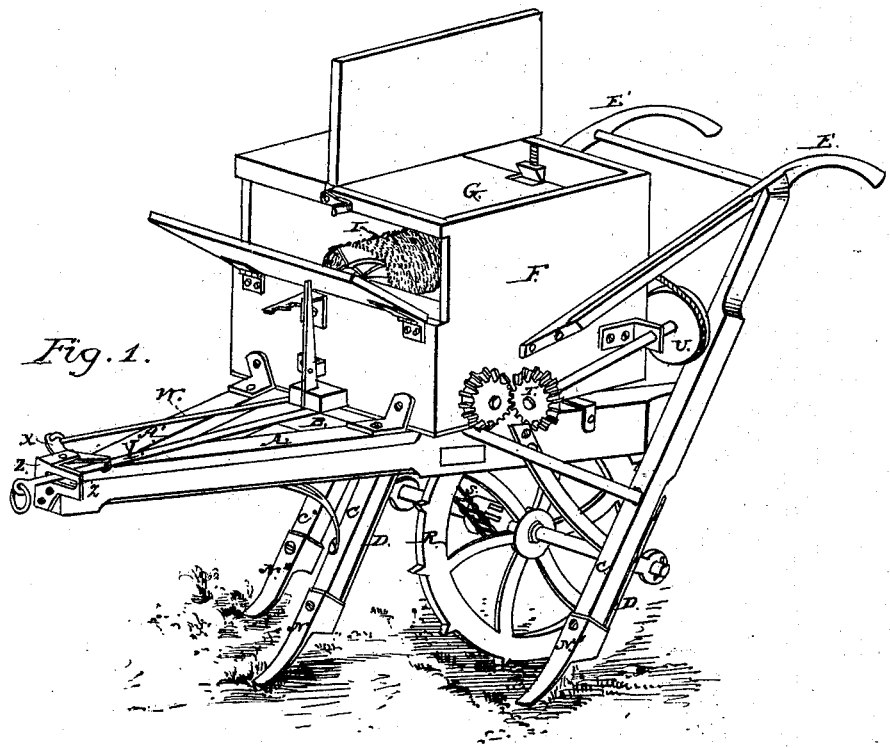
Figure 1 is a perspective view of a machine, embodying my improvements.
Figure 2:
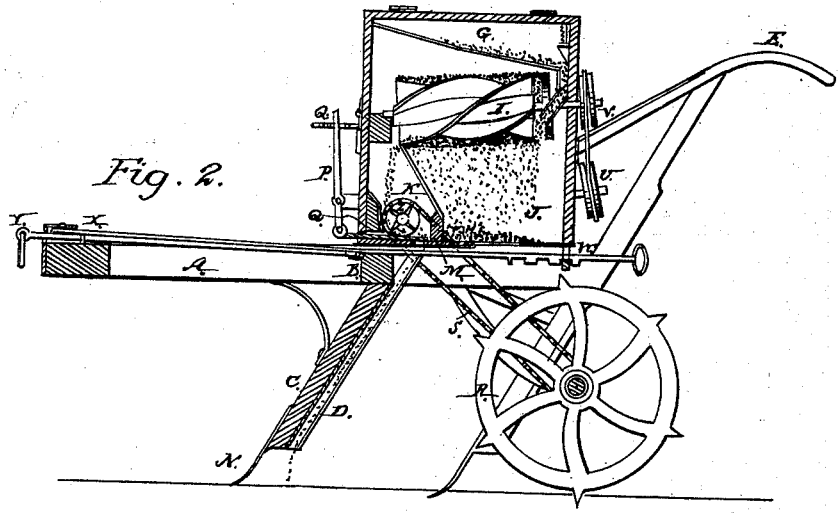
Figure 2 is a longitudinal section thereof.

The frame of my implement consists essentially of two beams, A A', joined firmly to each other in front, and diverging rearward and connected by a cross-rail, B, projecting downward and forward, from which and from the rear ends of the beams are three sheaths, C C' C'', whose lower portions carry at their rear sides conducting tubes D, for the grain, and to whose upper ends are attached two handles, E E'. Attached to and supported by the frame is my grain-box F, having in its upper part a chute, G, down which the grain travels to a spout, H, which conducts it into a revolving screen, I, from whose reticulated periphery the cheat and other small refuse escapes into an offal-chamber, J, the good and now clean grain escaping from the open end of the screen into a grain-chamber, K, containing an agitator, L, which delivers the grain in suitable quantities through three several ducts, M, whence it is conveyed to the ground through the tubes D. The ventage of each duct is immediately in rear of a share, N, N', or N'', that terminates each respective sheath, and the amount of grain dropped is regulated by a slide, O, operated by a lever, P, that enters either notch, $q$, of a rack, Q. The screen I and agitator L are actuated from the ground-wheel R by any suitable transmitting mechanism, S, T, U, V. An undue side draught either to the right or left is corrected by the husbandman without leaving his post by a simple pull or push of the notched rod W, which passing forward underneath the grain-box operates a bell-crank, X, which in turn moves to the right or left the forward end of the draught-rod Y, which rod is restricted to a horizontal plane by occupying a slot, $z$, in the clevis Z.

I claim herein as new, and of my invention—

1. The provision in a grain-drill of the separator I, between the place of supply and delivery, substantially as and for the purpose set forth.

2. The arrangement of notched rod W, bell-crank X, draught-rod Y, and slotted clevis Z, or their mechanical equivalents, for the optional rectification of the side draught by a person at the rear of the machine, substantially as set forth.

In testimony of which invention I hereunto set my hand.

HIRAM PULSE.

Witnesses:
GEO. H. KNIGHT,
JAMES H. LAYMAN.